United States Patent Office 2,878,274
Patented Mar. 17, 1959

2,878,274

NEUTRALIZING AND DECOLORIZING LARD INTERESTERIFICATION REACTION MIXTURE

Leon A. Van Akkeren, Oak Park, and Herbert J. Ast, Chicago, Ill., assignors, by mesne assignments, to Swift & Company, a corporation of Illinois No Drawing. Application July 1, 1955
Serial No. 519,665

4 Claims. (Cl. 260—410.7)

This invention relates to neutralizing glyceride interesterification reaction mixtures, or more particularly, to the neutralization of such reaction mixtures containing alkali metal catalysts and the removal of alkali metal from the glyceride product. The method of this invention has particular utility for neutralizing rearranged lard reaction mixtures.

Alkali metal interesterification catalysts have heretofore been employed for the rearrangement of fats, particularly for rearranging lard. Generally speaking, such rearrangement reactions are carried out by mixing the fat (triglyceride) with the alkali metal interesterification catalyst, and heating the mixture at temperatures favorable to interesterification reactions. The alkali metal catalyst, such as sodium methylate, reacts with the fat to form alkali metal glycerates. Some of the alkali metal catalyst also reacts with any free fatty acids present in the fat to form soaps.

Upon completion of the rearrangement reaction, it is desired to neutralize the reaction mixture, more particularly, the alkali metal glycerates therein, and to remove sodium from the desired product. Heretofore, this has been accomplished by adding water to the reaction mixture. Alkali metal glycerates are unstable in the presence of water, the water serving to liberate the alkali metal from the glycerate. In this way the alkali metal associated with the glycerate is converted to an alkali metal hydroxide, which tends to split a portion of the fat and saponify the fatty acids. The resultant soap, together with the soap originally formed by the addition of the alkali metal interesterification catalyst, settles or is filtered from the mixture. While this process has the advantage of alkali refining the rearranged fat and thereby removes undesirable color bodies therefrom, it has the disadvantage of producing a considerable loss of product. For example, when lard is rearranged with 0.5% sodium methylate, from 5 to 6% of the product may be lost when the reaction mixture is neutralized by adding water thereto. Theoretically, the product loss should be around 2.5%, this being the amount of soap which would be formed by the sodium in the reaction mixture, but this loss is magnified by the occlusion of fat to the soap.

It is therefore a general object of this invention to provide a method for neutralizing glyceride interesterification reaction mixtures containing alkali metal glycerates by means of which the alkali metal glycerate can be decomposed and the alkali metal removed while reducing the product loss by present neutralization methods. A still further object is to provide a method of the character described which minimizes the product loss and at the same time decolorizes the glyceride product. Further objects and advantages will appear as the specification proceeds.

In one of its aspects, this invention is concerned with a method of treating a glyceride interesterification reaction mixture containing fatty acid glycerides, alkali metal glycerates, and alkali metal soaps to decompose the alkali metal glycerates, which method is characterized by the step of mixing a salt-forming, acidic compound capable of decomposing alkali metal glycerates with the reaction mixture in a stoichiometric proportion to form a salt from all of the sodium in the reaction mixture less the amount of sodium which could form soaps with the free fatty acids in the mixture. By this procedure the reaction mixture can be neutralized by the substantially complete removal of sodium therefrom with a reduced loss of product. At the same time, an effective decolorizing will take place.

Reaction mixtures of the type in which the present invention is applicable are obtained when any fat is subjected to an interesterification reaction with an alkali metal interesterification catalyst. The method has particular value in connection with such processes for the rearrangement of edible fats where losses up to 5% or more of the product are a serious matter from an economic standpoint. The rearrangement of lard with alkali metal catalysts is currently being carried out on a large scale, and it is for this reason that the method of the present invention is illustrated in connection with rearranged lard reaction mixtures.

At present, the preferred alkali metal interesterification catalysts are alkali metal alcoholates like sodium methylate, although other alkali metal catalysts are operable, such as metallic sodium, potassium or lithium, or sodium, potassium or lithium hydride, etc. All alkali metal catalysts in fact form alkali metal alcoholates (glycerates) in the reaction mixture. The particular alkali metal interesterification catalyst, however, forms no part of the present invention. Instead, the invention is concerned with reaction mixtures produced by mixing a fat with any alkali metal interesterification catalyst and heating the mixture at interesterification temperatures. Alkali metal interesterification catalysts like sodium methylate, metal sodium, sodium hydride, etc. react with part of the fat to form alkali metal glycerates, which are also alkali metal alcoholates. Part of the original alkali metal catalyst also reacts with the free fatty acids present to form alkali metal soaps. Practically all commercial grade fats contain a small amount of free fatty acids, say .1 to .5%, and it is these free fatty acids which form soaps with the alkali metal of the primary catalyst. It has been previously thought that the presence of such free fatty acid was not particularly desirable, but the present invention provides a means for utilizing the soaps formed from these free fatty acids to effect decolorization of the product with a minimum loss of product, as will subsequently be explained in detail. It may be noted in passing that small amounts of other alkali metal compounds may be formed in the reaction mixture under certain conditions. Such compounds, however, do not interfere with the operation of the method of this invention, since it depends largely on the amount of soaps formed, which can be calculated from the free fatty acid content of the starting material before addition of the catalyst.

After the completion of the interesterification or rearrangement reaction, the reaction mixture will contain at least fatty acid glycerides, alkali metal glycerates, and alkali metal soaps. Other substances may also be present, such as mono-esters, certain impurities, etc., but these substances, as already indicated, are not important in practicing the present invention. It is known that acids, especially strong acids, are capable of decomposing alkali metal glycerates. For example, acids like hydrochloric, acetic, phosphoric, sulfuric, tartaric, lactic, and many others can be used. Any acid capable of decomposing alkali metal glycerates can be used for the purposes of this invention, but certain acids have been found to be preferred. Particularly good results are obtained with phosphoric acid, as will subsequently be explained. In addition, other salt-forming acidic compounds can be used, such as acetic anhydride, acetyl chloride, etc.

The reaction mixture is neutralized by mixing therewith an acid of the character described in an amount up to that which would be theoretically required to decompose all of the alkali metal glycerates and any other alkali metal compounds without decomposing the alkali metal soaps. This theoretical amount can readily be calculated by subtracting the moles of free fatty acid in the fat used as a starting material in the rearrangement reaction from the moles of alkali metal introduced into the reaction mixture by the alkali metal catalyst. In other words, this amount represents the amount of alkali metal associated with the fat as alkali metal glycerates or as other alkali metal alcoholates, whereas the rest of the alkali metal is associated with the free fatty acids as alkali metal soaps. If the amount of acid employed is such that there was an excess of acid available to decompose the alkali metal soaps, the product would not be satisfactorily decolorized. Apparently the color bodies present in the mixture occlude to the small amount of soap present, and can be removed with this soap. However, the present process is quite distinct from usual alkali refining procedures.

It has heretofore been thought that a fat could not be alkali refined in order to remove maximum color unless at least a slight excess of alkali was present. The function of the excess alkali is to promote the occlusion of the color bodies to the soap, thereby producing a decolorized fat. While this is apparently correct for ordinary alkali refining of fats, it does not apply to the process of this invention. In fact, it has been found that the decolorizing of a rearranged fat by the method of this invention can be carried out in the presence of several percent of free acids which may be formed during the refining operation.

The acid added to the reaction mixture may be added with or without water. When the acid is mixed with the reaction mixture with or without the presence of water, the alkali metal glycerates and any other alkali metal alcoholates are decomposed but when the quantity of acid is limited as set out above, it appears that the alkali metal soaps are not decomposed and that the color bodies occluded thereto are not disturbed. This is indicated by the fact that when excess acid over that required to form a salt from all of the sodium not associated with the free fatty acids as soaps is present, a darker product is obtained. In other words, the correct amount of acid to use is the amount required to form a salt with all of the sodium added as a catalyst minus the amount of sodium which would have reacted with the free fatty acids in the starting material to form soaps.

Treatment of the reaction mixture as described above produces an oil phase containing the neutralized, decolorized product, and a water phase containing the alkali metal soaps with the color bodies occluded thereto. Separation of the water phase from the oil phase by any suitable means effects decolorization of the product with a reduced product loss. By this method it is possible to reduce the product loss to as low as 1% or less, depending somewhat on the content of free fatty acids in the starting material. However, a starting material containing .3% free fatty acids produces sufficient soap to satisfactorily decolorize the rearranged fat by the method of this invention, and the loss of product can be held to less than 1%.

The conditions for neutralizing an interesterification reaction mixture in accordance with this invention are not particularly critical. However, to facilitate mixing of the acid with the reaction mixture in the presence of water, it is preferred to have the reaction mixture in a substantially liquid condition, which is the normal condition of such reaction mixtures upon completion of an interesterification reaction.

As indicated above, the use of phosphoric acid for neutralizing the reaction mixture gives excellent results. In this case, best results are achieved when the amount of phosphoric acid to be employed is calculated on the basis of 1 mole of acid per 2 moles of alkali metal in the alkali metal glyceride. In other words, the phosphoric acid should be assumed to form a di-salt of the alkali metal like disodium phosphate.

The method of this invention is further illustrated by the following specific examples.

*Example I*

517 g. of lard (F. F. A., 0.32%) was rearranged with 0.5% sodium methoxide in a 1-liter flask equipped with a stopcock at the bottom. The catalyst was decomposed with 1.6 cc. of 85% phosphoric acid, added dropwise. This amount of acid was sufficient to convert 90% of the sodium ion present to disodium acid phosphate. The resulting mixture was agitated for 15 minutes at 60° C. 4 cc. of water was added to hydrate and flocculate the soap and salts.

When the mixture had stood without stirring for 4 hours, about 3 cc. of precipitated material was drawn off through the stopcock. The oil phase was then water-washed. About 1200 cc. of hot tap water was used.

The water-washed lard was dried on a hot plate. The yield of light-colored oil was 513 g. The loss was .8%.

*Example II*

501.5 g. of lard (F. F. A., 0.32%) was rearranged as in Example I and the catalyst decomposed with 1.8 cc. of 75% phosphoric acid, added dropwise. This amount of acid was sufficient to convert 90% of the sodium present to disodium acid phosphate. The reaction temperature was 60° C. and the product was agitated for 15 minutes after the acid was added. Three cc. of water were added with stirring which was continued for 15 minutes. The mixture was water-washed without any preliminary separation of foots. A total of about 1.5 liters of hot tap water were used for this operation. The weight of the dried lard was 499 g. The loss was 0.5%. The oil produced was light in color.

*Example III*

Filtered, refined lard (F. F. A., 0.32%) was stirred at a temperature of around 60° C. for about 30 minutes with 0.5% of sodium methoxide. The resulting reaction mixture was decomposed with glacial acetic acid in an amount equivalent to 74% of the theoretical amount required to decompose the sodium glycerates, that is, equivalent to 74% of the sodium in the sodium methoxide less the molar equivalent of free fatty acids in the lard. Thereafter, water was added, 1 cc. of water being used for each 2 cc. of the previously added glacial acetic acid, and stirring was continued for 30 minutes. No filter aid was used. Separation of the precipitated soap in the water phase produced a light-colored oil phase containing the rearranged lard. The product loss was around 1.7%.

While in the foregoing specification the method of this invention has been described in detail and specific embodiments thereof have been set forth for purpose of illustration, it will be apparent to those skilled in the art that the method of this invention is susceptible to other embodiments and that many of the details set forth herein can be varied widely without departing from the basic concepts of the invention.

I claim:

1. In a process for modifying lard wherein lard containing minor amounts of free fatty acids and color bodies is treated with an alkali metal alcoholate catalyst to modify the lard, and the catalyst is destroyed and a decolorized modified lard is recovered from the reaction product, the method of improving the yield of the modified lard which comprises predetermining the free fatty acid content of the lard to be modified, adding sufficient catalyst to react with the free fatty acids to form soaps and to furnish in addition an amount of catalyst necessary to modify the lard, subjecting the mixture to modifying conditions of temperature and time, and then destroying the catalyst with an amount of acid necessary to substantially neutralize the alkali metal which is present in the catalyst portion without any excess of said acid being available to decompose the soaps, said soaps having said color bodies occluded thereto.

2. A process according to claim 1 wherein the catalyst is sodium methoxide.

3. A process according to claim 1 wherein the acid is phosphoric acid and the amount of the acid added is equivalent to that required to form disodium phosphate with the alkali metal.

4. A process according to claim 1 wherein the acid is added in an aqueous solution and an aqueous layer containing the soaps and neutralization products is separated from the modified lard.

References Cited in the file of this patent
UNITED STATES PATENTS

| | | |
|---|---|---|
| 2,309,949 | Gooding | Feb. 2, 1943 |
| 2,442,532 | Eckey | June 1, 1948 |
| 2,726,158 | Cochran et al. | Dec. 6, 1955 |
| 2,738,278 | Holman | Mar. 13, 1956 |

FOREIGN PATENTS

| | | |
|---|---|---|
| 491,896 | Canada | Apr. 7, 1953 |